(12) United States Patent
Frank

(10) Patent No.: US 6,293,258 B1
(45) Date of Patent: Sep. 25, 2001

(54) FUEL SUPPLY MODULE

(75) Inventor: Kurt Frank, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,543

(22) PCT Filed: Oct. 15, 1999

(86) PCT No.: PCT/DE99/03316

§ 371 Date: Jun. 1, 2000

§ 102(e) Date: Jun. 1, 2000

(87) PCT Pub. No.: WO00/23705

PCT Pub. Date: Apr. 27, 2000

(30) Foreign Application Priority Data

Oct. 21, 1998 (DE) .............................. 198 48 571

(51) Int. Cl.$^7$ .................................................. F02M 33/04
(52) U.S. Cl. ................................................................ 123/509
(58) Field of Search ................................... 123/509, 510, 123/516

(56) References Cited

U.S. PATENT DOCUMENTS

| 4,682,936 | 7/1987 | Suzuki et al. . | |
|---|---|---|---|
| 5,680,847 | * 10/1997 | Begley et al. | 123/509 |
| 5,699,773 | * 12/1997 | Kleppner et al. | 123/509 |
| 5,718,208 | 2/1998 | Brautigan et al. . | |
| 5,769,061 | * 6/1998 | Nagata et al. | 123/509 |
| 5,960,775 | * 10/1999 | Tuckey | 123/509 |
| 6,073,614 | * 6/2000 | Kleppner | 123/509 |
| 6,129,074 | * 10/2000 | Frank | 123/509 |

FOREIGN PATENT DOCUMENTS

| 196 19 992 A1 | 11/1997 | (DE) . |
|---|---|---|
| 0 384 41 A1 | 8/1990 | (EP) . |
| 0 754 851 A1 | 1/1997 | (EP) . |

OTHER PUBLICATIONS

Patent Abstracts of Japan, 58160545 of Sep. 24, 19983.
Patent Abstracts of Japan, 60147565 of Aug. 3, 1985.

* cited by examiner

Primary Examiner—Thomas N. Moulis
(74) Attorney, Agent, or Firm—Michael J. Striker

(57) ABSTRACT

A fuel feed module for feeding fuel in an internal combustion engine, in particular for use in a motor vehicle, which includes a reservoir cup (10) with a bottom (11), a fuel pump (20) with a pump element (28), disposed in the reservoir cup (10); the pump element (28) of the fuel pump (20) is disposed on the bottom (11) of the reservoir cup (10) in such a way that the fuel flows laterally into the pump element (28).

10 Claims, 3 Drawing Sheets

FUEL SUPPLY MODULE

BACKGROUND OF THE INVENTION

1. Field of the Invention

The invention relates to a fuel feed module for feeding fuel to an internal combustion engine, especially for use in a motor vehicle.

2. Prior Art

In motor vehicles, for feeding the fuel from a fuel tank to the engine, fuel pumps that are installed in the interior of the fuel tank are used. These fuel pumps are typically disposed on the bottom of the tank and are surrounded by a so-called reservoir cup, by which the fuel level directly around the fuel pump is kept at a predetermined level. This assures that while driving around a curve or on a hill, even if the fuel tank is already been pumped partly empty, the engine will reliably be supplied with fuel. The reservoir cup jointly with the fuel pump forms the fuel feed module. In order on the one hand to fill the reservoir cup with fuel from the tank, a suction jet pump is often used, which is driven by the fuel fed back by the engine. The fed-back fuel can, however, also flow directly into the reservoir cup. Furthermore, reservoir cups typically have two fuel filters, the first of which is located on the intake side upstream of the fuel pump, while the second, finer filter is downstream of the fuel pump.

A fuel module as defined by the preamble to claim 1 is disclosed for instance by German Patent Disclosure DE 196 19 992. In this construction, the installation height of the fuel pump inside the reservoir cup is determined on the one hand by the dimensions of the fuel pump but on the other by the upstream coarse filter and an intake nozzle with which the fuel is aspirated through the coarse filter. The intake nozzle is disposed together with the coarse filter above the bottom of the reservoir cup, so that the fuel flows in substantially at a right angle from below.

In this arrangement, however, the following problems arise. If the fuel level in the reservoir cup is below the coarse filter, the fuel feed pump and thus the engine are no longer supplied with fuel. Analogously to this poor residual aspiration performance, problems arise when the tank and the reservoir cup are first filled, because in this case as well, there must first be a minimum level of fuel in the reservoir cup before the fuel feed pump can begin its operation.

SUMMARY OF THE INVENTION

The fuel feed module of the invention having the characteristics of claim 1 has the advantage that the requisite minimum level of fuel in the reservoir cup is very low. The result is excellent residual aspiration performance of the fuel module and more-favorable performance the first time the tank is filled. Furthermore, the construction of the fuel pump is more economical, since the intake nozzle can be dispensed with. Because the fuel flows laterally to the pump element, a lower structural height of the fuel pump in the reservoir cup is also obtained, so that the overall fuel feed module has a smaller volume. This is an advantage not only for the capacity of the tank in which the fuel feed module is disposed but also with a view to the stability of the module, because more-compact dimensions lessen the harmful effects of the vibration that typically occurs in a motor vehicle.

By the provisions recited in the further claims, advantageous refinements of and improvements to the fuel feed module defined by claim 1 are possible.

In a preferred embodiment, the fuel pump includes a housing that has a lateral inflow opening, which is disposed in the lower region of the reservoir cup, so that even the slightest residual amounts of fuel in the reservoir cup can still be aspirated. The inflow opening of the housing is preferably disposed directly on the bottom of the reservoir cup. In a further preferred version, the inflow opening is bounded on its underside by a part of the housing of the fuel pump.

The fuel module preferably also has a filter that is disposed in the reservoir cup, so that the fuel can be filtered before it flows in. The filter is preferably embodied as a basket filter that surrounds the fuel pump. In a preferred embodiment, the basket filter serves to brace the fuel pump in the reservoir cup. In this version, no additional devices are needed for bracing the fuel pump in the upper region.

BRIEF DESCRIPTION OF THE DRAWINGS

The invention is described in further detail in the ensuing description in terms of a plurality of embodiments shown in the drawing. Shown are.

DETAILED DESCRIPTION OF PREFERRED EMBODIMENTS

Figure 1:
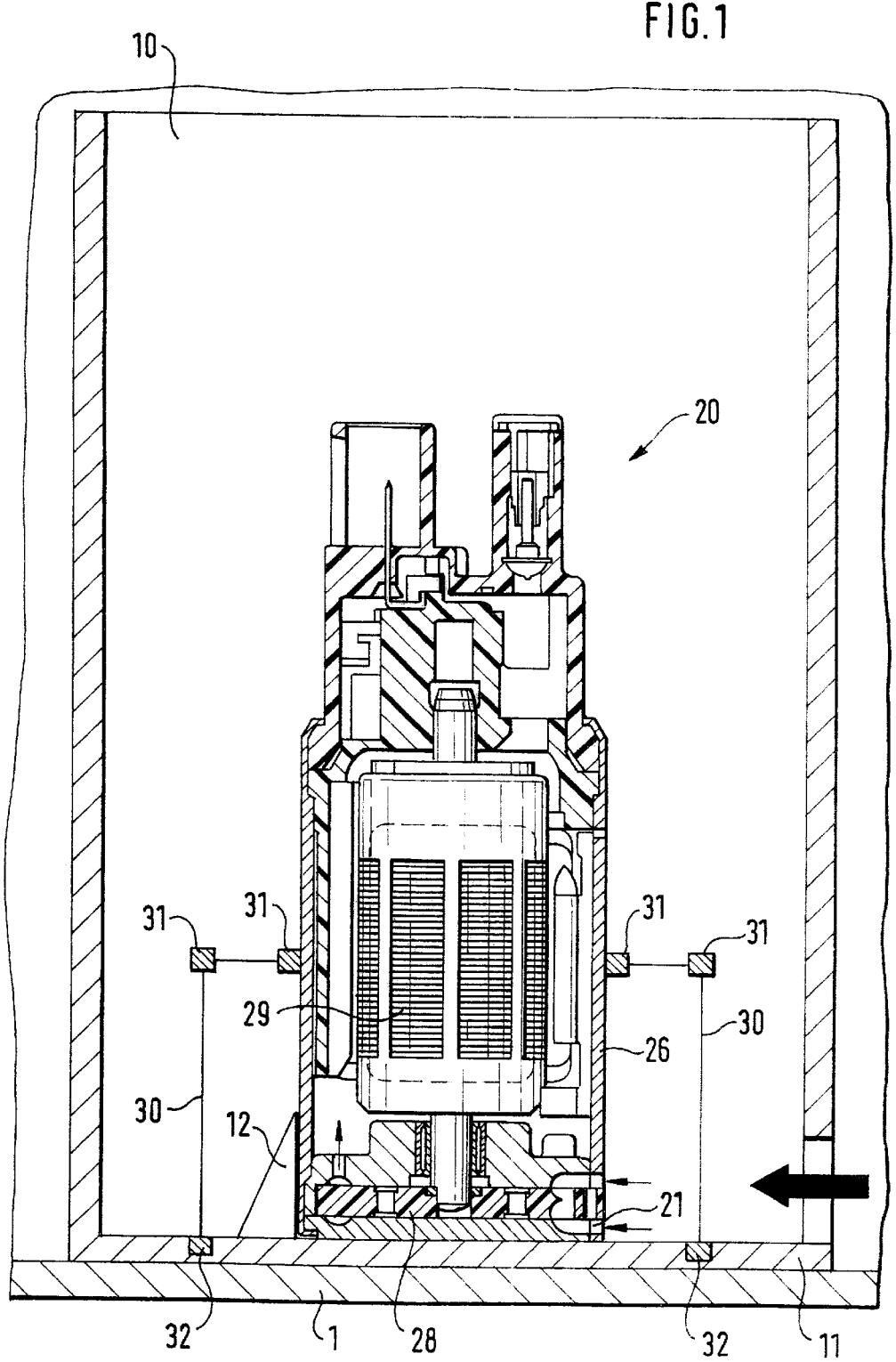
FIG. 1: a side view of the fuel feed module in a first embodiment.

With reference to FIG. 1, the fuel feed module includes a reservoir cup 10, which is disposed in a tank 1. A fuel pump 20, which supplies an internal combustion engine (not shown) with fuel, is located on a bottom 11 of the reservoir cup 10. As indicated schematically by a black arrow at the bottom right of FIG. 1, the fuel is fed out of the tank 1 into the reservoir cup 10 via a suction pump or the like (not shown). The fuel pump 20 includes an electric motor 29, which drives a pump element located beneath it, in the form of a pump wheel 28. However, along with this design, other pump constructions with diaphragms or other pump mechanisms for feeding the fuel are also conceivable.

Both the drive motor 29 and the pump wheel 28 are surrounded on the outside by a housing 26 of the fuel pump 20. On its right-hand side, the housing 26 has a lateral inflow opening 21 for the pump wheel 28, through which the fuel flows laterally to the pump wheel 28 during operation. The inflow opening 21 is disposed in the lower region of the reservoir cup 10. In the preferred embodiment shown in FIG. 1, the inflow opening 21 is bounded on its lower side by a part of the housing 26. As a result of the described structure, even at the least possible fuel levels in the reservoir cup 10, fuel will still be aspirated. No separate intake nozzle.

Figure 2:
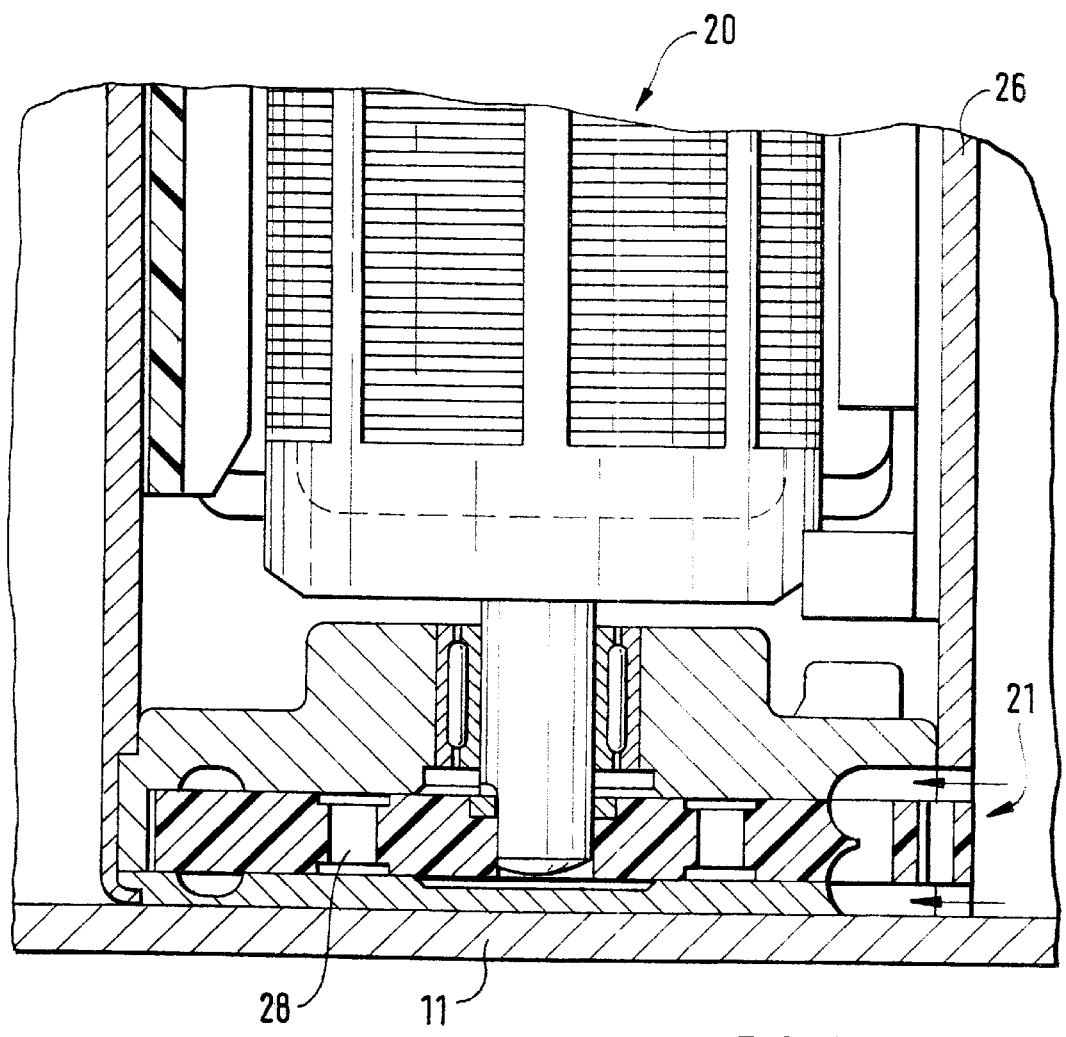
FIG. 2: an enlarged view of the lower region of the fuel pump in a further preferred embodiment.

In a further embodiment of the invention, which is shown enlarged in FIG. 2, the inflow opening 21 is disposed directly on the bottom of the reservoir cup 10. This still further optimizes the residual aspiration performance of the fuel feed module.

Figure 3:
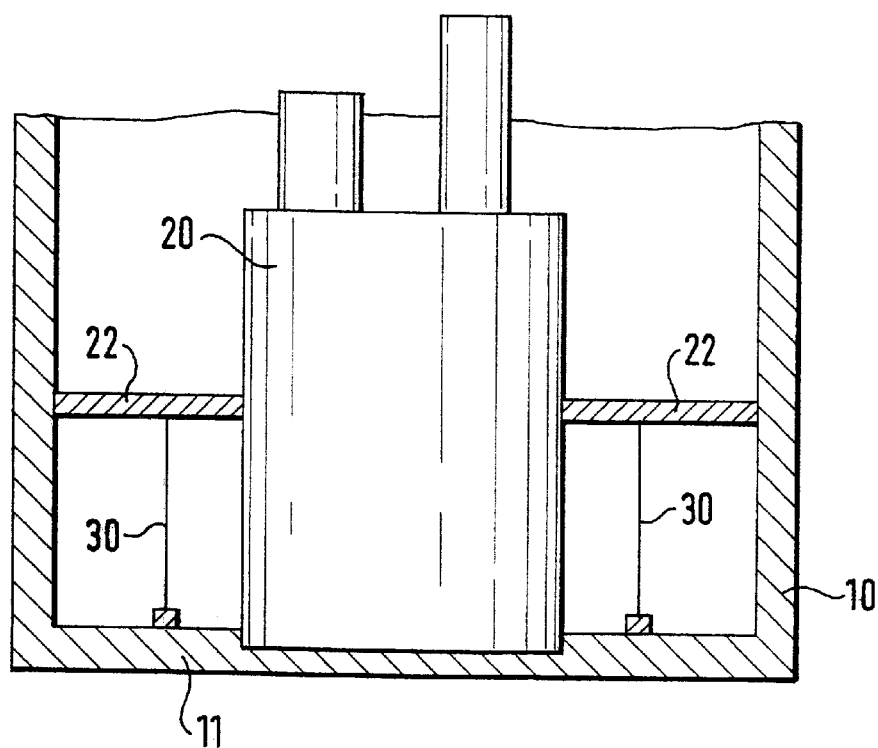
FIG. 3: a schematic illustration of the fuel module of a further embodiment.

In the embodiment schematically shown in FIG. 3, the pump wheel 28 is also disposed in an indentation in the bottom 11 of the reservoir cup 10. As a result, residual quantities of fuel are prevented from collecting around the pump wheel 28 and thus in front of the inflow opening 21.

Figure 4:
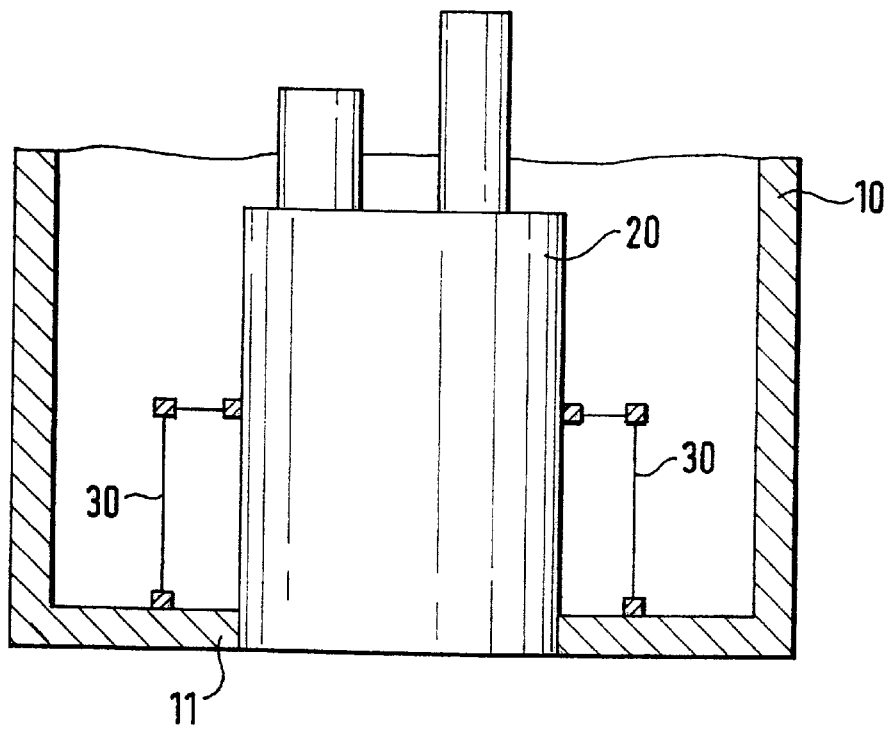
FIG. 4: a schematic illustration of the fuel module in a further embodiment.

In a further embodiment, schematically shown in FIG. 4, the pump wheel 28 is disposed in a recess in the bottom 11 of the reservoir cup 10. This achieves the same effect as in the embodiment of FIG. 3 but reduces the structural height of the fuel modules still further and economizes on material.

Referring once again to FIG. 1, a (coarse) filter 30 is preferably disposed around the lower region of the fuel pump 20. This filter 30 prevents contaminants in the fuel or deposits from reaching the inside of the fuel pump. The filter 30 is preferably embodied as a basket filter. Because of its circular disposition around the fuel pump 20, a large filter area is made possible, so that the service life is increased, and replacement of the filter 30 during the average life of a vehicle is unnecessary. This is a substantial advantage over known fuel feed modules, in which the comparatively small coarse filter is located underneath the fuel pump 20, so that replacing a clogged filter entails considerable effort and expense because the fuel pump has to be dismantled.

In the preferred embodiments shown in FIGS. 1 and 4, the basket filter 30 is also used for bracing the fuel pump 20 in its upper region. To achieve the requisite stability for this purpose, the basket filter 30 has a plurality of reinforcing elements 31. For securing it, the basket filter 30 is inserted into corresponding receiving elements 32 in the bottom 11 of the reservoir cup 10. The connection can be made by detent locking, adhesive bonding, or similar methods.

In the embodiment shown in FIG. 3, stiffening ribs 22 for bracing purposes are located between the fuel pump 20 and the outer walls of the reservoir cup 10. These stiffening ribs are preferably constructed in resilient fashion, to prevent vibration that originates in the fuel pump from transmitted to the reservoir cup and thus to the tank of the vehicle. In this embodiment, the filter 30 is secured to the stiffening ribs 22 at its upper edge.

For securing the fuel pump 20 to the bottom 11 of the reservoir cup 10, a plurality of ribs 12 (see FIG. 1) are preferably provided, which taper obliquely upward. The suspension of the fuel pump 20 is thus made stiffer, so that the mechanical stresses that are caused by vibration of the fuel pump 20 can be better withstood. As an alternative, the fuel pump 20 is fixed with a ring (not shown), which extends around the bottom 11 of the reservoir cup 10 and is split in the region of the inflow opening 21. Examples of conceivable connecting methods for fastening to the ribs or to the ring are screwing, riveting, detent locking, adhesive bonding, or similar known techniques.

As the material for the reservoir cup, the fastening ribs or the fastening ring of the fuel pump and for the stiffening ribs in the embodiment of FIG. 3, a fuel-resistant plastic is preferably used, to save expense and weight.

What is claimed is:

1. A fuel feed module for feeding fuel in an internal combustion engine, in particular for use in a motor vehicle, the fuel feed module comprising:
    a) a reservoir cup (10) with a bottom (11);
    b) a fuel pump (20) with a pump element (28), disposed in the reservoir cup (10);
    c) wherein the pump element (28) of the fuel pump (20) is disposed on the bottom (11) of the reservoir cup (10) in such a way that the fuel flows laterally into the pump element (28); and
    d) wherein the fuel pump includes a housing (26), which has a lateral inflow opening (21) for the pump element, which opening is disposed in the lower region of the reservoir cup (10) and the inflow opening (21) of the housing (26) is disposed directly on the bottom (11) of the reservoir cup (12).

2. A fuel feed module for feeding fuel in an internal combustion engine, in particular for use in a motor vehicle, the fuel feed module comprising:
    a) a reservoir cup (10) with a bottom (11);
    b) a fuel pump (20) with a pump element (28), disposed in the reservoir cup (10);
    c) wherein the pump element (28) of the fuel pump (20) is disposed on the bottom (11) of the reservoir cup (10) in such a way that the fuel flows laterally into the pump element (28); and
    d) wherein fuel pump includes a housing (26), which has a lateral inflow opening (21) for the pump element, which opening is disposed in the lower region of the reservoir cup (10) and the inflow opening (21) is bounded on an underside thereof by a part of the housing (26) of the fuel pump (20).

3. The fuel feed module of claim 1, in which the pump element (28) is disposed in one of an indentation and a recess of the bottom (11) of the reservoir cup (10).

4. The fuel feed module of claim 1, in which furthermore a filter (30) is disposed in the reservoir cup (10) in order to filter the fuel before it flows into the fuel pump.

5. The fuel feed module of claim 4, in which the filter (30) is embodied as a basket filter that surrounds the fuel pump (20).

6. The fuel feed module of claim 5, in which the basket filter (30) braces the fuel pump (20) in the reservoir cup (10).

7. The fuel feed module of claim 5, in which the basket filter (30) is seated directly on the bottom (11) of the reservoir cup (10).

8. The fuel feed module of claim 1, in which the fuel pump (12) is secured by ribs (12) to the bottom of the reservoir cup (10).

9. The fuel feed module of claim 1, in which the fuel pump (20) is secured to the bottom (11) of the reservoir cup (10) by means of an encompassing ring having a recess at the inflow opening (21).

10. A tank, in particular for use in a motor vehicle, the tank comprising a fuel feed module including:
    a) a reservoir cup (10) with a bottom (11);
    b) a fuel pump (20) with a pump element (28), disposed in the reservoir cup (10);
    c) wherein the pump element (28) of the fuel pump (20) is disposed on the bottom (11) of the reservoir cup (10) in such a way that the fuel flows laterally into the pump element (28); and
    d) Wherein the fuel pump includes a housing (26) which has a lateral inflow opening (21) for the pump eleven which opening is disposed in the lower region of the reservoir cup (10) and the inflow opening (21) of the housing (26) is disposed directly on the bottom (11) of the reservoir cup (12).

* * * * *